(12) United States Patent
Traub

(10) Patent No.: US 12,452,342 B2
(45) Date of Patent: Oct. 21, 2025

(54) COMPUTER-IMPLEMENTED METHODS FOR CATEGORIZING THE ACTIVITY OF A WORKER

(71) Applicant: Benjamin Traub, Englewood, FL (US)

(72) Inventor: Benjamin Traub, Englewood, FL (US)

(*) Notice: Subject to any disclaimer, the term of this patent is extended or adjusted under 35 U.S.C. 154(b) by 60 days.

(21) Appl. No.: 18/496,752

(22) Filed: Oct. 27, 2023

(65) Prior Publication Data
US 2024/0146822 A1 May 2, 2024

Related U.S. Application Data
(60) Provisional application No. 63/381,553, filed on Oct. 29, 2022.

(51) Int. Cl.
| | |
|---|---|
| *H04L 67/50* | (2022.01) |
| *G06F 11/34* | (2006.01) |
| *G06Q 10/0631* | (2023.01) |
| *G06Q 30/04* | (2012.01) |

(52) U.S. Cl.
CPC ........ *H04L 67/535* (2022.05); *G06F 11/3438* (2013.01); *G06Q 10/063114* (2013.01); *G06Q 10/063118* (2013.01); *G06Q 30/04* (2013.01)

(58) Field of Classification Search
CPC .............. H04L 67/535; G06F 11/3438; G06Q 10/063114
See application file for complete search history.

(56) References Cited

U.S. PATENT DOCUMENTS

| | | | | |
|---|---|---|---|---|
| 5,696,702 | A * | 12/1997 | Skinner | G06F 11/3438 714/E11.193 |
| 5,963,914 | A * | 10/1999 | Skinner | G06F 11/3423 714/E11.193 |
| 7,203,479 | B2 * | 4/2007 | Deeds | H04M 1/72403 455/406 |
| 2002/0128803 | A1 * | 9/2002 | Skinner | B21B 37/50 714/E11.193 |
| 2006/0190725 | A1 * | 8/2006 | Huang | G06F 11/3438 713/168 |
| 2007/0260983 | A1 * | 11/2007 | Wadhwa | G06Q 10/06 715/700 |
| 2010/0324964 | A1 * | 12/2010 | Callanan | G06Q 10/063114 705/7.42 |
| 2013/0205366 | A1 * | 8/2013 | Luna | H04L 63/101 726/1 |
| 2014/0289817 | A1 * | 9/2014 | Matsushima | H04L 63/08 726/4 |
| 2017/0374132 | A1 * | 12/2017 | Karlson | H04L 67/04 |
| 2019/0108392 | A1 * | 4/2019 | Wang | G06T 7/246 |
| 2021/0342194 | A1 * | 11/2021 | Zhang | G06F 9/5038 |
| 2022/0391852 | A1 * | 12/2022 | Stevens | G06Q 10/1097 |
| 2022/0400065 | A1 * | 12/2022 | Cioffi | H04L 41/5006 |

(Continued)

FOREIGN PATENT DOCUMENTS

CN 101355462 B * 8/2011

*Primary Examiner* — Oanh Duong
(74) *Attorney, Agent, or Firm* — Sam Pierce

(57) ABSTRACT

According to an aspect of the present invention, there is provided a computer-implemented method for measuring the productivity of a user, comprising: measuring, at a user computer terminal, the duration of time a worker is focused on specific work-product files, URLs or software applications; and measuring the inputs of the worker over that duration of time.

13 Claims, 2 Drawing Sheets

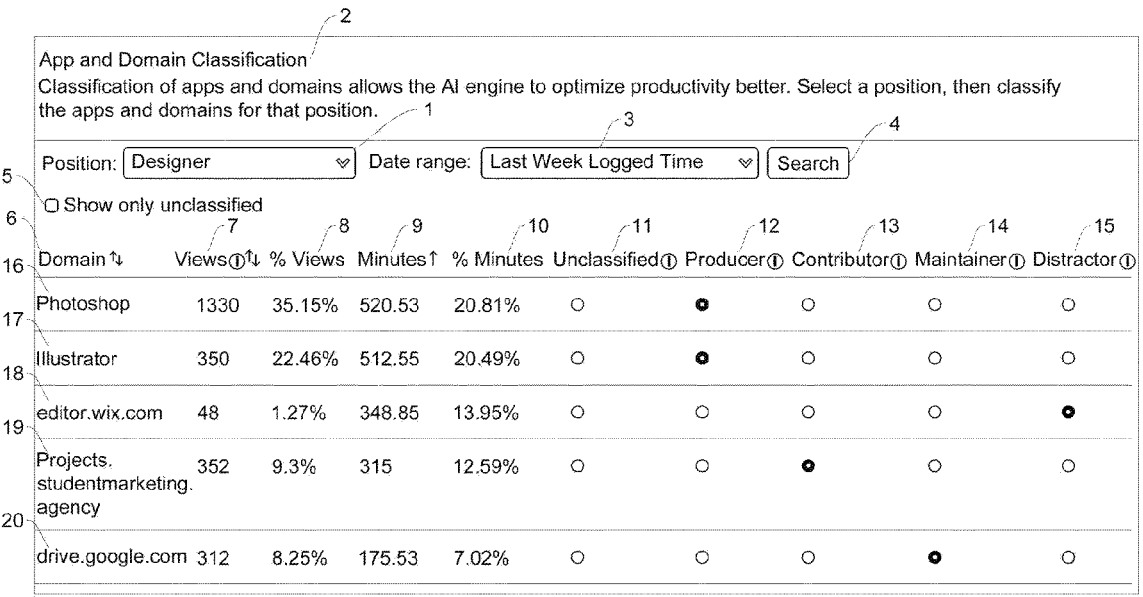

(56) References Cited

U.S. PATENT DOCUMENTS

| | | | |
|---|---|---|---|
| 2023/0237564 A1* | 7/2023 | Park | G06Q 30/0625 705/26.81 |
| 2023/0269264 A1* | 8/2023 | Yao | H04L 63/1425 726/23 |
| 2024/0037469 A1* | 2/2024 | Dowd | G06Q 10/06313 |

* cited by examiner

App and Domain Classification
Classification of apps and domains allows the AI engine to optimize productivity better. Select a position, then classify the apps and domains for that position.

| Position: Designer ⌄ | Date range: Last Week Logged Time ⌄ | Search | | | | | |
|---|---|---|---|---|---|---|---|
| ☐ Show only unclassified | | | | | | | |
| Domain ↕ | Views ⓘ↕ | % Views | Minutes ↑ | % Minutes | Unclassified ⓘ | Producer ⓘ | Contributor ⓘ | Maintainer ⓘ | Distractor ⓘ |
| Photoshop | 1330 | 35.15% | 520.53 | 20.81% | ○ | ● | ○ | ○ | ○ |
| Illustrator | 350 | 22.46% | 512.55 | 20.49% | ○ | ● | ○ | ○ | ○ |
| editor.wix.com | 48 | 1.27% | 348.85 | 13.95% | ○ | ○ | ○ | ● | ○ |
| Projects.studentmarketing.agency | 352 | 9.3% | 315 | 12.59% | ○ | ○ | ● | ○ | ○ |
| drive.google.com | 312 | 8.25% | 175.53 | 7.02% | ○ | ○ | ○ | ● | ○ |

| | 30 | 31 | 32 | 33 | 34 | 35 | 36 | 37 |
|---|---|---|---|---|---|---|---|---|
| | user_id | Date | Total time | Work product High val | Work product Low val | Supporting work | NON work | Unknown |
| 38 | 56 | January 1, 2023 | 8 hours | 3.5 hours | 2.5 hours | 1 hours | 0.5 hours | 0.5 hours |
| 39 | 91 | January 1, 2023 | 6 hours | 2 hours | 1 hour | 2 hours | 1.5 hours | 1.5 hours |

FIG. 3

| | 40 | 41 | 42 | 43 | 44 |
|---|---|---|---|---|---|
| | Worker_id | Date | Total time | inputs into Work-Product | inputs per minute into Work-Product |
| 45 | 56 | January 1, 2023 | 8 hours | 4400 | 9.2 |
| 46 | 91 | January 1, 2023 | 8 hours | 6500 | 13.5 |

FIG. 4

Assume 2-way communication between the connected components

- 50 Digitally stored index of Work-Product
- 51 Digitally stored index of 'Black' URLs or files
- 52 Digitally stored index of 'supporting' URLs or files
- 53 Software to create Focus Data
- 54 Software to create User-Input Data
- 55 Software to classify the Focus Data and User-Input Data
- 56 Computing & Storage device

COMPUTER-IMPLEMENTED METHODS FOR CATEGORIZING THE ACTIVITY OF A WORKER

BACKGROUND

Systems and methods for monitoring employee activity have been described. For example, US20210295221 describes collecting electronic monitoring data which may include data that is generated from electronic monitoring of an employee's activities while the employee is logged into an organization's private network and/or using an electronic device (such as a computing device, a mobile device, or the like) that is owned and/or maintained by an organization, for example browsing history, file transfer history, file editing history, communications data (e.g., email and voicemail data), keylogging and/or keystroke data, mouse click data, screen-shot data, peripheral device access data, video monitoring data, and/or the like.

Though collecting electronic monitoring data has been described, however, prior art is lacking in effective methods for utilizing electronic monitoring data to measure productivity, at least because prior art lacks efficient methods to categorize it.

SUMMARY OF INVENTION

For many organizations, the productivity of a worker is directly related to the worker's time and input into specific URLs or files (commonly referred to as "Work-Product" or "Deliverables"), or into certain software applications where Work-Product is produced, such as a graphic designer's inputs into the application known as Photoshop while designing logos or brochures. A worker's time and input may also be focused on other URLs, files or software applications, where Work-Product is not directly being worked on. This may include time and inputs related to research that might eventually be utilized directly in the Work-Product (such as a writer researching a book that will eventually be written). Thus the worker's time and inputs may be made directly into the Work-Product, indirectly into tangential aspects of the Work-Product, or not related to Work-Product at all. The differentiation between Work-Product and non-work-product is of significant importance due to the fact that, for certain organizations, Work-Product is where value is created. While other categories of focus may indirectly contribute to the value creation process, in and of themselves, these other categories have no value. This concept has been overlooked in prior art, specifically in the context of categorizing time and inputs for the purpose of measuring productivity.

This invention provides systems and methods for providing granular definition to the time spent and inputs that workers make while focused on Work-Product and other files, URLs, and software applications both relevant and irrelevant to the job duties of a worker, clearly classifying the time and inputs into categories which are useful in determining a worker's true productivity. A patent attorney may be working on a application (work-product) and also researching related prior-art (non-work-product). It would be important to capture time spent on both in order to gauge productivity According to an aspect of the present invention, there is provided a computer-implemented method for categorizing the activity of a worker, comprising classifying, on a computing device, one or more files, URLs, and/or software applications into categories comprising at least Work-Product and one or more additional categories.

According to another aspect of the present invention, there is provided system for categorizing the activity of a worker, comprising: a display device; a computer memory device; and at least one processor arranged to: classify one or more files, URLs, and/or software applications into categories comprising at least Work-Product and one or more additional categories; store the classifications on the computer memory device; and display one or more visual representations of the one or more files, URLs, and/or software applications in the categories comprising at least Work-Product and one or more additional categories.

BRIEF DESCRIPTION OF THE DRAWINGS

FIG. 1 illustrates a user interface (UI) for implementing embodiments of the present invention;

FIG. 2 illustrates a categorization of worker time;

FIG. 3 illustrates a summary of worker inputs; and

FIG. 4 is a schematic drawing of a hardware device for implementing embodiments and associated software.

DETAILED DESCRIPTION

The following description is exemplary and describes how the user interface is used in conjunction with the underlying computer system to provide a more accurate categorization of user activity.

FIG. 1 shows a graphical user interface (GUI) that can be used to classify URLs or applications for individual job roles according to how directly or indirectly they are related to the production of Work-Product. For example, URLs, files and applications may be classified as "producer" where they are directly associated with generation of work product. Other URLs, files and applications may be classified as "contributor" where they support, indirectly, the generation of work product. Still others may be classified as "maintainer" where they do not support generation of work product but maintain the proper operation of the underlying system. And, lastly, URLS, files and applications may be classified as "distractor" where they take time away from work-product generation, support for work-product generation, and are not required for maintaining system operation.

Position selector (FIG. 1, 1) allows the administrator to select a particular worker by name or job title. In the example of FIG. 1, the position selected is Designer. It could also be possible to select a category including multiple workers, who could both be designers, for example.

In an example embodiment, there is a list of job positions in position selector (FIG. 1,1) there is a list of files, URLs and software applications typically used for making inputs into Work product, as well as an index that associates the two. The index can further associate the Work product to specific tasks, projects, or clients. Embodiments are capable of identifying files, URLs or applications that a worker has in focus on their device, and how long the worker focuses on those files, URLs or applications, and the quantity of inputs from the user over that time. Time focused on those particular files, URLs or software applications is deemed to be focused on work product by virtue of their definition as environments in which work product is produced. Alternatively, there is simply a list of URL's and software applications that have been classified as environments where work product is modified (for a specific job position), even if it is without the association between a specific task, project or client. With this data productivity can be measured in the context of the URLs, files and software applications, but not in the context of the task, project or client.

Title 2 of (FIG. 1,2) provides an explanation of the GUI. Title 2 is App and Domain Classification and the explanatory text says "Classification of apps and domains allows the AI engine to optimize productivity better. Select a position, then classify the apps and domains for that position."

Date range selector 3 (FIG. 1, 3) allows the manager to select a date range for which data will be analyzed. Search button 4 (FIG. 1, 4) initiates a command which issues a command to the underlying computing system to retrieve data according to the selections made in date range selector 3 (FIG. 1, 3) and position selector 1 (FIG. 1, 1). "Show only unclassified" button 5 (FIG. 1, 5) allows the manager of a worker or workers to filter the domain data retrieved, showing only domains which have not been classified. "Domain" heading 6 (FIG. 1, 6) includes a feature for sorting by domain, for example, alphabetically by domain.

"Views" heading 7 (FIG. 1, 7) includes a feature for sorting by number of views, that is, sorting the domains in the data by the number of times those domains were viewed by the worker(s) selected in position selector 1 (FIG. 1, 1). The "% of views" heading 8 (FIG. 1, 8) shows the percentage of views recorded, for the domain in the corresponding row, out of the total views of all domains over the time period selected in date range selector 3 (FIG. 1, 3).

"Minutes" heading 9 (FIG. 1, 9) includes a feature for sorting by number of minutes, that is, sorting the domains in the data by the number of minutes those domains were in focus for the worker(s) selected in position selector 1 (FIG. 1, 1). The "% of minutes" heading 10 (FIG. 1, 10) shows the percentage of views recorded for the domain, in the corresponding row, out of the total views of all domains over the time period selected in date range selector 3 (FIG. 1, 3).

"Unclassified" heading 11 (FIG. 1, 11) shows the administrator the as-yet unclassified URLs or software application. A file, URL, or software application could be categorized as unclassified if the worker was using, for example, a website unfamiliar to the administrator in the organization who is performing the categorization selections.

"Producer" heading 12 (FIG. 1, 12) provides an administrator the ability to set a file, URL, or software application as a producer. A file, URL, or software application is categorized as a producer if the file, URL, or software application is used to produceWork Product by a worker in the position selected by position selector 1 (FIG. 1, 1).

"Contributor" heading 13 (FIG. 1, 13) provides a manager the ability to set a file, URL, or software application as a contributor. A file, URL, or software application could be categorized as a contributor if the file, URL, or software application is used to support the creation of Work product for a worker in the position selected by position selector 1 (FIG. 1, 1). For example, a contributor file, URL, or software application might be used by a worker to research what to input into a producer file, URL, or software application.

"Maintainer" heading 14 (FIG. 1, 14) provides a manager the ability to set a file, URL, or software application as a maintainer. A file, URL, or software application could be categorized as a maintainer if the file, URL, or software application is used to complete tasks which do not contribute towards inputs into Work product by a worker in the position selected by position selector 1, but do involve other incidental duties of a worker, for example, running antivirus software for maintaining a secure PC.

"Distractor" heading 15 (FIG. 1, 15) provides a manager the ability to set a file, URL, or software application as a distractor. A file, URL, or software application could be categorized as a distractor if file, URL, or software application is not used for any tasks related to work by a worker in the position selected by position selector 1. For example, a worker may be visiting a veterinarian's website to schedule an appointment for the worker's pet.

Each of the producer, contributor, maintainer, and distractor categories could be divided further into multiple sub-categories. The sub-categories could be based on the price of the Work-Product, for example, the hourly or fixed rate paid by the client. The sub-categories could also be based on the relative importance, or priority, of the file, URL, or software application in completing the Work-Product, apart from the price of the Work-Product.

"Photoshop" domain row 16 (FIG. 1, 16) is classified as a producer for a worker in the designer position selected by position selector 1 (FIG. 1, 1) because Work-product inputs are made into Photoshop for a designer. The 1,330 views of Photoshop were recorded for the worker, which constituted 35.15% of all views. The 520.53 minutes were recorded in Photoshop for the worker, which constituted 20.81% of all minutes.

"Illustrator" domain row 17 (FIG. 1, 17) is classified as a producer fora worker in the designer position selected by position selector 1 (FIG. 1, 1) because Work-product inputs are made into Illustrator for a designer. The 350 views of Illustrator were recorded for the worker, which constituted 22.46% of all views. The 512.55 minutes were recorded in Illustrator for the worker, which constituted 20.49% of all minutes recorded.

The "editor.wix.com" domain row 18 (FIG. 1, 18) is classified as a distractor for a worker in the designer position selected by position selector 1 (FIG. 1, 1) because wix.com is not relevant to the work duties of a designer in this exemplary organization. The 48 views of editor.wix.com were recorded for the worker, which constituted 1.27% of all views. The 348.85 minutes were recorded in editor.wix.com for the worker, which constituted 13.95% of all minutes recorded.

The "Projects.studentmarketing.agency" domain row 19 (FIG. 1, 19) is classified as a contributor for a worker in the designer position selected by position selector 1 (FIG. 1, 1) because Projects.studentmarketing.agency provides, for example, files, URLs, or other resources for making Work-product inputs for a designer. The 352 views of Projects.studentmarketing.agency were recorded for the worker, which constituted 9.3% of all views. The 315 minutes were recorded in Projects.studentmarketing.agency for the worker, which constituted 12.59% of all minutes recorded.

The "drive.google.com" domain row 20 (FIG. 1, 20) is classified as a maintainer for a worker in the designer position selected by position selector 1 (FIG. 1, 1) because a designer's job duties include storing files on Google Drive even though storage of the files does not constitute inputs into Work-product, and does not stimulate inputs into Work-product. The 312 views of drive.google.com were recorded for the worker, which constituted 8.25% of all views. The 175.53 minutes were recorded in drive.google.com for the worker, which constituted 7.02% of all minutes recorded.

Each of the selections made categorizing rows 16-20 can be freely changed among unclassified, producer, contributor, maintainer, and distractor, and productivity metrics can be interactively calculated and altered according to the changes made to the radio buttons in rows 16-20 (FIG. 1, 16-20). While individual files, that is, job1234.docx, or picofmydog.jpg, are not shown in the drawing of FIG. 1, it is an option to include individual files and categorize those files as producer and distractor.

FIG. 2 illustrates a categorization of worker time for two workers. The "user_id" column (FIG. 2, 30) heading contains identification numbers for workers whose time is being categorized. The "Date" column (FIG. 2, 31) heading contains the date on which the categorization of time is being displayed for the worker identified under user_id column heading. The "Total time" column (FIG. 2, 32) heading contains the aggregate amount of time being categorized on the date listed under date column heading.

The "Work product High val" column (FIG. 2, 33) heading contains the amount of time the worker identified under user_id column heading spent working on high value work product on the date listed under date column heading. The "Work product Low val" column (FIG. 2, 34) heading contains the amount of time the worker identified under user_id column heading spent working on low value work product on the date listed under date column heading. The amounts of time falling under both columns constitute time in which a worker is engaged in making inputs into a work product, and the classification into low value and high value work product could be made for instance based on the hourly rate or other rate being charged the client for production of the work product.

Delineating between high value and low value Work product can be done by ranking certain tasks, projects or clients (the subject of the work product) based on value. There can be a list of software applications, URLs, and files as well as an index that associates them to tasks, projects, or clients. Time focused on those particular URLs or files is deemed to be focused on work product by virtue of their association with the tasks, projects or clients. Alternatively, there is simply a list of URLs and files that have been classified as work product, even if it is without the association between a specific task, project or client. With this data, productivity can be measured in the context of the software application, URL or file, but not in the context of the task, project or client. Thus, there is no delineation of high value and low value.

The "Supporting work" column(FIG. 2, 35) heading contains the amount of time the worker identified under user_id column heading spent working on supporting work on the date listed under date column heading. Supporting work can be work that does not directly constitute input into a Work product, but is necessary to, for example, research what inputs should be made into a Work product.

The "NON work" column (FIG. 2, 36) heading contains the amount of time the worker identified under user_id column heading spent doing computer tasks other than work on the date listed under date column heading. The NON work hours could be, for example, time spent communicating with family and friends via e-mail or social media, time spent applying for other jobs, or time spent playing online games.

The "Unknown column" (FIG. 2, 37) heading contains the amount of time the worker identified under user_id column heading spent in a fashion which cannot be otherwise categorized. Time could be categorized as unknown if the worker was using, for example, a website unfamiliar to the manager, in the organization setting the categorization rules, as described with reference to FIG. 1. This time might or might not be helpful time in achieving progress on Work product, and further investigation might be undertaken, for example, asking the worker for more details on the time marked unknown, to make a more accurate assessment.

Row 38 (FIG. 2, 38) describes the breakdown of time spent for a first worker with a user_id of 56 and row 39 (FIG. 2, 39) describes the breakdown of time spent for a second worker with a user_id of 91. The data for both Row 38 and Row 39 was recorded on Jan. 1, 2023 and both rows consist of 8 hours of data. As shown in Row 38, the worker with a user_id of 56 spent 3.5 hours engaged in high value Work product, 2.5 hours engaged in low value Work product, 1 hour engaged in Supporting work, 0.5 hours engaged in NON work, and 0.5 hours engaged in uncategorizable activities. As shown in Row 39, the worker with a user_id of 56 spent 2 hours engaged in high value Work product, 1 hour engaged in low value Work product, 2 hours engaged in Supporting work, 1.5 hours engaged in NON work, and 1.5 hours engaged in uncategorizable activities.

FIG. 3 illustrates a summary of worker inputs and calculation of productivity for two workers. Worker_id column heading 40 contains identification numbers for workers whose time is being categorized. Date column heading 41 contains the date on which the inputs are being displayed for the workers identified under Worker_id column heading 40. Total time column heading 42 contains the aggregate amount of time worked on the date listed under date column heading 41.

inputs into Work-Product column heading 43 contains total numbers of inputs made by the workers identified under Worker_id column heading 40 during the aggregate amount of time worked on the date listed under date column heading 41. inputs per minute into Work-Product column heading 44 contains calculations comprising the total inputs under inputs into Work-Product column heading 43 divided by the aggregate amount of time worked on the date listed under date column heading 41 expressed in minutes (480 minutes).

Row 45 describes the inputs of a first worker with a Worker_id of 56 and row 46 describes the inputs of a second worker with a Worker_id of 91. The data for both Row 45 and Row 46 was recorded on Jan. 1, 2023 and both rows consist of 8 hours of data. As shown in Row 45, the worker with a Worker_id of 56 made 4400 inputs into Work-Product over the 8 hours (480 minutes) measured, for an inputs per minute into Work-Product of 9.2. As shown in Row 4,6 the worker with a Worker_id of 91 made 6500 inputs into Work-Product over the 8 hours (480 minutes) measured, for an inputs per minute into Work-Product of 13.5.

The data of FIG. 2 and FIG. 3 illustrate that while worker 91 spent more time engaged in NON work activities, worker 56 actually made fewer inputs into Work product. The granular analysis made possible by the present invention may allow for unexpected insights. For example, it may be the case that workers taking some larger amount of time to engage in NON work activities is restorative to emotional and/or cognitive functioning in a manner that allows for substantially greater productivity on a per-minute basis engaged in Work product, offsetting the decline in hours engaged in Work product. These analyses may yield different insights in different organizations and with different individuals, and provide a way for managers and organizations to optimize performance in view of individual and organizational characteristics.

FIG. 4 is a schematic drawing of a hardware device for implementing embodiments and associated software components. "Computing & Storage device" (FIG. 4, 56) comprises at least a processor and a memory. Computing & Storage device may implement the methods described herein using customized hard-wired logic and/or program logic. The methods can be performed in response to the processor executing instructions contained in the memory. Execution of the instructions contained in the memory causes processor to perform the processes described herein. There may also be provided one or more input/output device(s) ("I/O device") communicatively connected to the Computing & Storage device. The I/O device could be, for example, a keyboard, a display configured to respond to pressure applied, or a mouse configured to respond to pressing and/or holding. Computing & Storage device features two-way connection with each of the memory components (FIG. 4, 50-52) and application components (FIG. 4, 53-55).

"Digitally stored index of Work-Product" (FIG. 4, 50) contains files, URLs, or software applications which constitute Work-Product sold by the organization to its customers. These are the files, URLs, or software applications into which the inputs considered to be Work-product are made by workers, and are typically the highest value files, URLs, or software applications for an organization.

"Digitally stored index of 'Black' URLs or files" (FIG. 4, 51) could also contain an index of 'Black' software applications. 'Black' files, URLs, or software applications are computer tasks other than work on the data. 'Black' files, URLs, or software applications could be, for example, used for communicating with family and friends via e-mail or social media, applying for other jobs, or playing online games.

"Digitally stored index of 'supporting' URLs or files" (FIG. 4, 52) could also contain an index of 'supporting' software applications. A file, URL, or software application could be categorized as 'supporting' if the file, URL, or software application is used to support the creation of Work product for a worker in the worker's position. For example, a 'supporting' file, URL, or software application might be used for a worker to research what to input into a producer file, URL, or software application.

"Software to create Focus Data" (FIG. 4, 53) is software used to monitor and record, for example, a worker's screenshot data. Software to create Focus Data assesses whether a period of time is used for Work-Product.

"Software to create User-Input Data" (FIG. 4, 54) is software used to monitor and record a worker's inputs, for example, keylogging and/or keystroke data and mouse-click data.

"Software to classify the Focus Data and User-Input Data" (FIG. 4, 55) cross-references User-Input data with Focus data to determine which inputs have been made in Work-Product.

Embodiments can further comprise an electronic communications link between devices described. That is, multiple devices, for example, those belonging to a worker and to a manager, may be able to communicate by an electronic and/or telecommunications network.

Additionally, computer readable media storing computer readable code for carrying out the method steps identified above is provided. The computer readable media stores code for carrying out subprocesses for carrying out the methods described above.

A computer program product recorded on a computer readable medium for carrying out the method steps identified above is provided. The computer program product comprises computer readable means for carrying out the methods described above.

Having thus described a few particular embodiments of the invention, various alterations, modifications, and improvements will readily occur to those skilled in the art. Such alterations, modifications, and improvements are intended to be part of this description though not expressly stated herein, and are intended to be within the spirit and scope of the invention. Accordingly, the foregoing description is by way of example only, and not limiting.

What is claimed is:

1. A computer-implemented method for categorizing activity of a worker, comprising:
    making a selection of a particular worker by an administrator;
    classifying, on a computing device, one or more files, Uniform Resource Locators (URLs), and/or software applications into categories comprising at least Work-Product and one or more additional categories;
    digitally storing an index of a subset of the URLs and files which are associated with Work-Product;
    dividing each of the categories further into multiple sub-categories delineating between high value and low value Work product by ranking associated tasks, projects or clients based on value;
    measuring, on a computing device of the particular worker, inputs of the particular worker into specific files, URLs and/or software applications; and
    classifying, on a computing device, the inputs of the worker into specific files, URLs, and/or software applications into the categories comprising the at least Work-Product and the one or more additional categories; and
    calculating a metric of the particular worker's productivity based the inputs of the particular worker into the specific files in the multiple sub-categories.

2. The method of claim 1, wherein one of the one or more additional categories comprises supporting files, URLs and/or software applications other than Work Product files necessary to complete a Work-Product file.

3. The method of claim 1, wherein one of the one or more additional categories comprises files, URLs and/or software applications unrelated to completing a Work-Product file but germane to the job responsibilities of the worker.

4. The method of claim 1, wherein one of the one or more additional categories comprises supporting files, URLs and/or software applications of an unknown nature.

5. The method of claim 1, wherein one of the one or more additional categories comprises files, URLs and/or software applications distracting from the job responsibilities of the worker.

6. The method of claim 1, further comprising:
    measuring, on a computing device of the worker, durations of time a worker is focused on specific files, URLs and/or software applications; and
    classifying, on a computing device, the duration of time the worker is focused on specific files, URLs, and/or software applications into categories comprising at least Work-Product and one or more additional categories.

7. The method of claim 1, further comprising sub-classifying the Work- Product category into two or more different sub-categories based on the value of the work product.

8. The method of claim 1, wherein URLs or files comprise one or more of emails, documents, presentations, databases, voicemail, audio files, image files, video files, social media, and web sites.

9. The method of claim 1, wherein the inputs are keystrokes or mouse clicks.

10. The method of claim 1, wherein the classification of files, URLs, or software applications into categories comprising at least Work-Product and one or more additional categories is accomplished via operations on a graphical user interface configured to display multiple category headings.

11. The method of claim 10, wherein a graphical user interface provides radio buttons to categorize files, URLs and software applications.

12. The method of claim 1, wherein classification is conducted by loading an index of files, URLs, and/or software applications labeled by category.

13. The method of claim 12, wherein the index is created by using scripts to scan file data.

\* \* \* \* \*